United States Patent [19]
Nashiki et al.

[11] Patent Number: 5,903,080
[45] Date of Patent: May 11, 1999

[54] RELUCTANCE TYPE SYNCHRONOUS MOTOR

[75] Inventors: Masayuki Nashiki; Akiyoshi Satake, both of Niwa-gun, Japan

[73] Assignee: Okuma Corporation, Nagoya, Japan

[21] Appl. No.: 08/873,919

[22] Filed: Jun. 12, 1997

[30] Foreign Application Priority Data

Jun. 18, 1996 [JP] Japan ................................. 8-156517

[51] Int. Cl.⁶ ......................... H02K 19/02; H02K 19/10; H02K 1/22
[52] U.S. Cl. ......................... 310/168; 310/261; 310/162
[58] Field of Search .................................. 310/162, 163, 310/156, 166, 168, 261

[56] References Cited

U.S. PATENT DOCUMENTS

| | | | |
|---|---|---|---|
| 2,870,352 | 1/1959 | Wiliford | 310/162 |
| 3,210,584 | 10/1965 | Jorgensen et al. | 310/265 |
| 3,671,789 | 6/1972 | Menzies | 310/163 |
| 3,721,844 | 3/1973 | Fong | 310/166 |
| 4,459,502 | 7/1984 | El-Antably | 310/184 |
| 4,751,416 | 6/1988 | Török | 310/156 |
| 4,888,513 | 12/1989 | Fratta | 310/216 |
| 4,924,130 | 5/1990 | Fratta | 310/162 |

FOREIGN PATENT DOCUMENTS

| | | | |
|---|---|---|---|
| 1638449 | 8/1971 | Germany | 310/163 |
| 2621301 | 12/1976 | Germany | 310/163 |
| 1757034 | 8/1992 | U.S.S.R. | 310/163 |
| 1757035 | 8/1992 | U.S.S.R. | 310/163 |

*Primary Examiner*—Clayton LaBalle
*Attorney, Agent, or Firm*—Oliff & Berridge, PLC

[57] ABSTRACT

A reluctance type synchronous motor comprises: a stator with a plurality of slots placed at an even pitch angle wherein stored inside each slot is a stator winding for creating stator magnetic poles with a predetermined phase alternating current being supplied thereto. A rotor sustained by a shaft and changing magnetic reluctance in its circumferential direction by inclusion inside of a plurality of magnetic isolating portions creates desired magnetic poles. At least one of the central angles between magnetic poles created at the rotor is shifted from the other central angles so that torque ripples during rotation can be reduced.

11 Claims, 14 Drawing Sheets

RELUCTANCE TYPE SYNCHRONOUS MOTOR

BACKGROUND OF THE INVENTION

1. Field of the Invention

The present invention relates to a structure of a rotor for improving torque ripple reduction of a reluctance type synchronous motor used for feed drive and positioning of a machining spindle of a machine tool. More specifically, the present invention aims to improve the characteristics by adjusting magnetic reluctance change of both a rotor and a stator relative to a rotation angle of the motor.

2. Description of the Related Art

Motor torque ripples are mainly caused by permeance changes due to changes in relative positions of a rotor and a stator. By this permeance change, magnetic energy stored in void spaces between a rotor and a stator changes, which leads to torque ripples. More specifically, stator slot ripples due to stator tooth and pole ripples due to magnetic poles of a rotor are cited as causes of torque ripples.

As a method to reduce torque ripples (mainly slot ripples) of a motor creating magnetic field using a permanent magnet and used for servo mechanism, a technique to skew a central angle of magnetic poles of a stator or a rotor in rotational direction by an angle equivalent to one or two times a pitch angle of a slot (the angle depending on winding order) has been known conventionally.

The main objective of this technique is to cancel phases of torque ripples in macroscopic view by skewing rotor or stator magnetic poles.

FIG. 14 shows an example of a conventional reluctance type synchronous motor.

For convenience in explanation, an example with 6 air slits per one magnetic pole of a rotor, 4 rotor magnetic poles rotor, and 12 stator slots is shown. Slits are not necessarily air slits, and the numbers of magnetic poles and slots are not limited to the numbers used here.

The stator 1 is composed of a layer of thin, soft magnetic material plates made of a material such as silicon steel. The stator comprises teeth and slots. Each slot stores a stator winding 5.

The rotor composed of a layer of thin, soft magnetic material plates 2 which includes magnetic isolating portions 4 creating magnetic paths in the plates 2. The magnetic isolating portions 4 can be composed of non-magnetic material such as resin or aluminum. This example uses air which is the simplest and most convenient magnetic isolating portion. In other words, the soft magnetic material 2 is filled with air stored in the slits.

In this example, the rotor structure is implemented by layering soft magnetic material plates. Therefore, minute joints exist at the periphery of the rotor (so that the rotor will not break into pieces due to the slits of the magnetic isolating portions 4). Magnetic short circuits in these joints can be ignored by thinning the joints.

If soft magnetic material plates are cut into a horse shoe shape and layered/fixed radially along a q-axis 7 and centered at a rotational shaft 3 (generally called a "flux barrier type reluctance motor"), the minute joints described above are not necessary.

The magnetic poles defined at the rotor by the magnetic isolating portions 4 have two imaginary axes used for explanation of motor control. One of these is a d-axis 6 which is a magnetic pole center and the other is the q-axis 7 which is a magnetic boundary of the neighboring poles.

For motor control, a field current (d-axis current) which generates a field component flows through the d-axis 6, while an armature current (q-axis current) which generates a torque component flows through the q-axis 7.

By the flow of the field current, a solenoid equivalent to a permanent magnet of a permanent magnet motor is created at the rotor. The armature current is exactly the same as an armature current of a permanent magnet motor. Therefore, by controlling d-axis and q-axis currents, a torque and control performance of a reluctance motor, which are equivalent to a permanent magnet motor and according to the Flemming's left hand law, can be obtained.

As is already known, small magnetic domains are created within a permanent magnet of a permanent magnet motor, and each magnetic domain has a magnetomotive force. In other words, a magnetic flux density at the surface of a magnetic pole can be almost even, since there exists means to confine the small magnetic flux.

However, in a relationship between teeth of the stator 1 and magnetic paths of a rotor of a reluctance type synchronous motor (composed of soft magnetic material 2 and the magnetic isolating portions 4), the soft magnetic material creating magnetic paths in rotational direction exists separately, which leads to dispersed magnetic energy stored in void spaces between the stator 1 and the rotor.

The dispersed magnetic energy appears as torque ripples upon controlling of the motor, and may cause troubles such as noise or undulated machining patterns of work piece when the reluctance motor of this kind is used for feeding the rotational shaft.

As described above, in a permanent magnet motor using a permanent magnet on a rotor, magnetic domains are created within the permanent magnet, and each domain has a magnetomotive force. Therefore, a magnetic flux density at the surface of magnetic poles is almost even, since there exists means to confine the magnetic flux. As a result, skewing of magnetic poles of a rotor or a stator can easily reduce torque ripples (especially slot ripples due to a stator slot period).

However, if a rotor of a synchronous motor is composed of a soft magnetic material and rotates in synchronization with rotating magnetic field of a stator, magnetic flux to passes an area of low magnetic reluctance within magnetic poles of the rotor. Therefore, reducing torque ripples by skewing is difficult due to the fact that a gap width of a rotor's magnetic poles relative to a stator's magnetic poles is different (i.e., an effective gap width of the rotor is reduced due to skewing), which leads to leakage of magnetic flux towards low magnetic reluctance areas within the rotor.

SUMMARY OF THE INVENTION

The present invention is created considering the above-described situation. The objective of the present invention is to provide a reluctance type synchronous motor which enables torque ripple reduction with a simple structure and also realizes better control.

The objectives of the present invention is achieved by creating uneven central angles of a plurality of magnetic poles defined at a rotor. In other words, a rotor of the present invention has magnetic poles having central angles shifted in circumference direction relative to even central angles of magnetic poles of a stator. More specifically, the magnetic poles of the rotor of the present invention have shift angles in circumferential direction relative to the even central angles of the magnetic poles of the stator, and the shift angles are ±½ of the stator slot pitch angles. Alternatively, the magnetic poles of the rotor of the present invention may have shift angles in circumferential direction relative to the even central angles of the magnetic poles of the stator, and the shift angles are ±⅓ of the stator slot pitch angles. The rotor of the present invention may also have the magnetic poles of the above-described structure in both the circumferential direction and along the rotational shaft direction.

An aperture angle of the rotor, which is an angle each magnetic isolating portion makes at the rotor periphery with a center of the rotational shaft may gradually change in circumferential direction from a d-axis to a q-axis. Having the above-described structure of the rotor, the objective of the present invention is achieved.

Alternatively, by employing a rotor combining these magnetic poles described above, the objective of the present invention is also achieved.

In the present invention, by declining central angles of magnetic poles, magnetic energy change between dispersively changing gaps of the rotor and the stator can be compensated or averaged. By gradually changing either one or both of the structures of the soft magnetic material creating magnetic paths and magnetic isolating portions in radial direction, sinusoidal distribution of total inductance can be obtained, although inductance changes between the stator and the rotor are partially dispersive. By combining this effect with the foregoing averaging method, a reluctance type synchronous motor with low torque ripples and better control performance can be obtained. Due to reducing torque ripples without using any known skewing technique, advantages such as easier assembly and thus cost reduction can also be obtained.

DESCRIPTION OF THE PREFERRED EMBODIMENTS

Hereafter, preferred embodiments of the present invention will be explained while referring to the figures. If not specifically described otherwise, components having the same index or number are meant to have the same function or performance.

Figure 1:
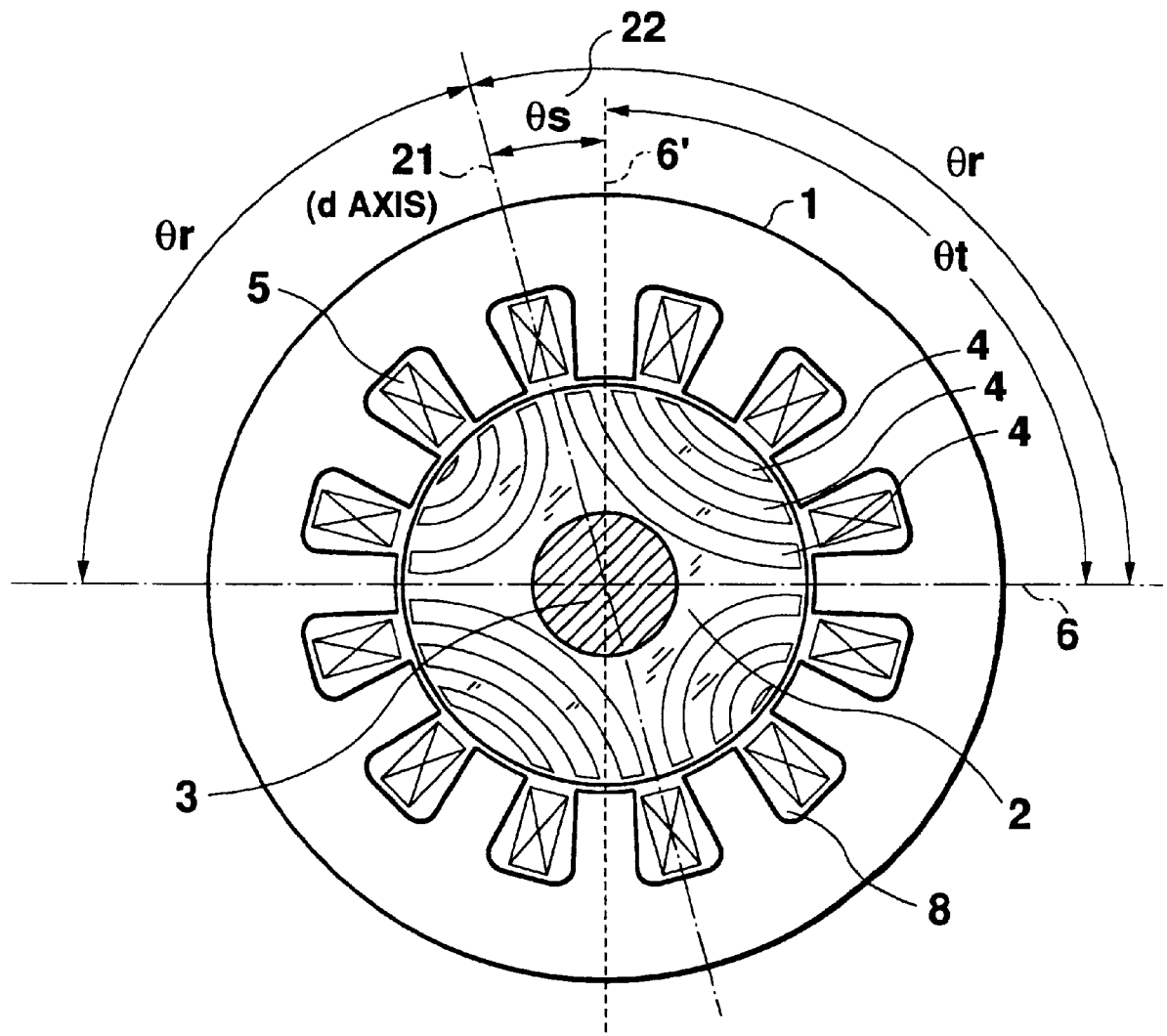
FIG. 1 is a diagram showing a first embodiment of a rotor and a stator of a synchronous motor related to the present invention.

FIG. 1 is a diagram showing a first embodiment of the present invention. Hereafter, air is used as a magnetic isolating portion. Therefore, the magnetic isolating portions are slit shaped. Differing from the example of the related art, magnetic isolating portions 4 are set so that one of related d-axes 21 is shifted by a shift angle $\theta_s$ 22 from a d-axis 6' which is an original center line of a pole. Determining shift angle $\theta_s$ 22 arbitrary will not be effective, and $\theta_s$ 22 is better found using the following equations (1)–(3).

Let an even central angle of magnetic poles created at a rotor $\theta_r$. This basic central angle $\theta_t$ is expressed as follows:

$$\theta_t = (360/P) \text{ [deg]} \tag{1}$$

with P being the number of magnetic poles of the rotor. Now, the shifting angle $\theta_s$ 22 is expressed as follows:

$$\theta_s = \pm (360/Ns)/(P/m) \text{ [deg]} \tag{2}$$

with Ns being the number of slots of the stator and m being an arbitrary integer. It is confirmed through experiments that an angle shifted by this shift angle $\theta_s$ 22 is effective. As a result, a central angle of magnetic poles $\theta_r$ is expressed as follows:

$$\theta_r = \theta_t \pm \theta_s \text{ [deg]} \tag{3}$$

In the present embodiment, an example with the number of magnetic poles of the rotor P=4, the number of slots of the stator Ns=12, and an arbitrary integer m=2 is shown. Therefore, the basic central angle $\theta_t$=90°, and the shift angle $\theta_s$=15°. As a consequence, the central angles of magnetic poles become 105° and 75°. These are the shifted angles to reduce ripple components called slot ripples mainly caused by teeth of the stator 1.

Now, another example with other parameter numbers will be explained below.

Figure 2:
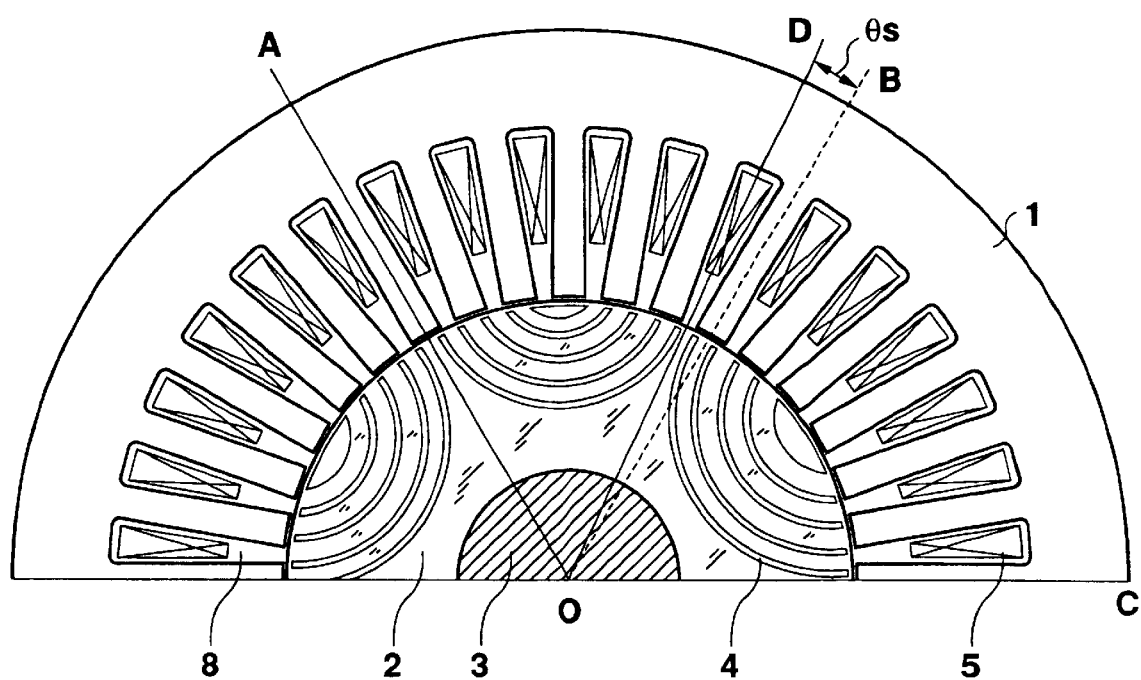
FIG. 2 is a diagram showing a second embodiment of a rotor and a stator of a synchronous motor related to the present invention.

FIG. 2 shows a second embodiment with the number of magnetic poles P=6, the number of slots of a stator Ns=36, and an arbitrary integer m=3. Since a basic central angle $\theta_t$ is 60°, and a shift angle $\theta_s$ becomes 5°, central angles of magnetic poles $\theta_r$ become 65° and 55°. These angles are equal to the basic central angle plus/minus ½ of a slot angle of the stator.

In FIG. 2, ∠AOB shown in dotted line is 60°, which is equivalent to the basic central angle of the stator. ∠AOD and ∠DOC are the angles shifted by ±$\theta_s$(=5°) from each magnetic pole. They are the central angles of magnetic poles $\theta_r$=65° or 55°. A magnetic path pitch Sp of a rotor can be arbitrary on design. It is confirmed, however, that Sp found by the following equation enhances torque ripple reduction effect. (It is because ripples occur periodically so that cancellation of them becomes easier than non-periodic ripples.)

$$Sp=(n+\tfrac{1}{2})\,(360/Ns)\cdot(1/k) \qquad (4).$$

Here, n is 0 or a natural number, (360/Ns) is a slot pitch angle of a stator, and k is an arbitrary natural number.

If k=1, and
if n=0, Sp=5°
if n=1, Sp=15°
if n=5, Sp=55°.

(The magnetic path pitch Sp of the rotor means an angle made by the lines connecting a rotational shaft center O and the edges of an arc-like magnetic path created by each slot at the rotor circumference.) Magnetic path pitches in FIG. 2 are the 6 angles calculated as in the above.

It is understood from FIG. 2 that if one side of a magnetic path created by a slit of the rotor faces an aperture of the stator, the other side of the magnetic path is set to a position facing a tooth of the stator.

If k=2, Sps become halves of the above-described ones. Therefore, the number of slits increases, and it is not necessarily true that if one side of a magnetic path created by a slit of the rotor faces an aperture of the stator, and the other side of the magnetic path is set to a position facing a tooth of the stator. However, relative positions of teeth and/or apertures of a stator and magnetic paths (slits) of a rotor generally have the above-described relationship.

A third embodiment with a condition m=2 added to the conditions of the second embodiment will be explained below, referring to FIG. 3.

Using equations (1)–(3), a basic central angle $\theta_t$=60° (=∠AOB), a shift angle $\theta_s$ =3.3°, central angles of magnetic poles $\theta_r$=63.3° or $\theta_r$=58.35° are found.

Figure 3:
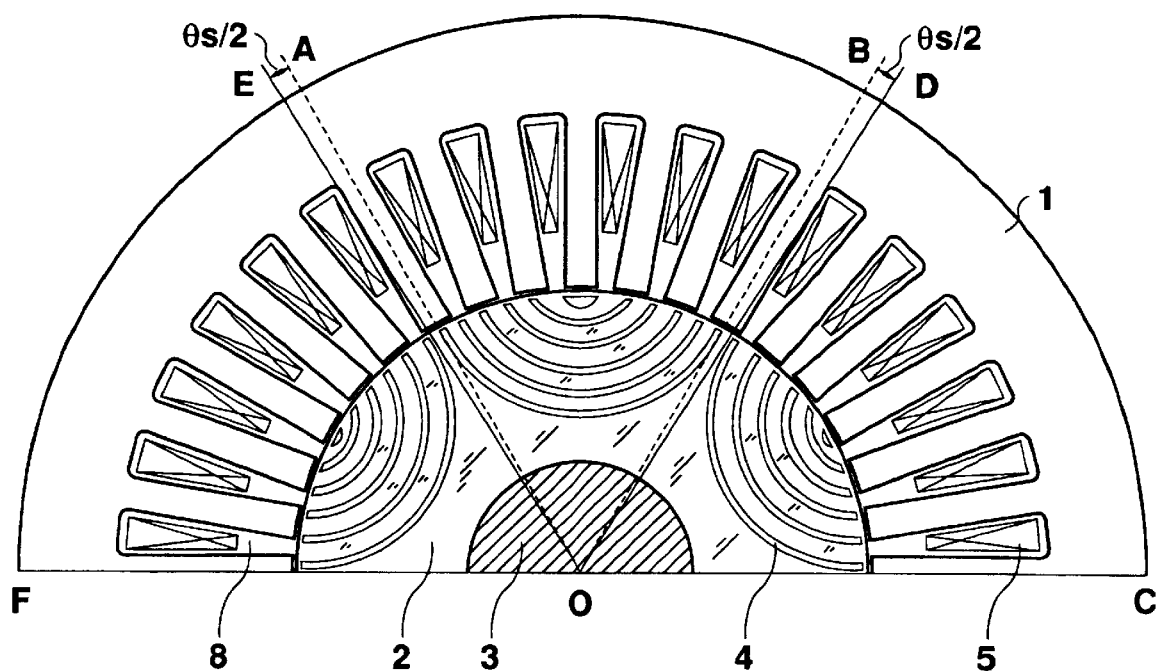
FIG. 3 is a diagram showing a third embodiment of a rotor and a stator of a synchronous motor related to the present invention.

As shown in FIG. 3, the basic central angle $\theta_t$ is ∠AOB, when a half circle (i.e., 180°) is considered as one unit of a rotor structure, one pole exists at the central angle $\theta_r$=63.3° (=∠EOD), which is the 3.3° angle added to the basic central angle $\theta_t$=60°. The central angles of the other two poles are (180−63.3)/2=58.35° (=∠DOC=∠EOF). A combination of these magnetic poles will be considered next. When 360° view is taken, the rotor comprises one pair of magnetic poles whose central angle is 63.3°, and other two pairs of magnetic poles whose central angles are both 58.35°. This means that each magnetic path of the rotor creates magnetic poles whose phase is shifted by ⅓ of a slot of a stator. Therefore, ripples can be explained as a rotating magnetic field when 3-phase alternating currents are supplied to an AC motor, and the value of ripples are calculated by composing magnetic reluctance changes occurring at each magnetic pole. In this way, dispersed magnetic reluctance change can be averaged. (Phases of magnetic paths created at each slit are shifted by 0, ⅓, and ⅔ of the slot angle.)

Figure 4:
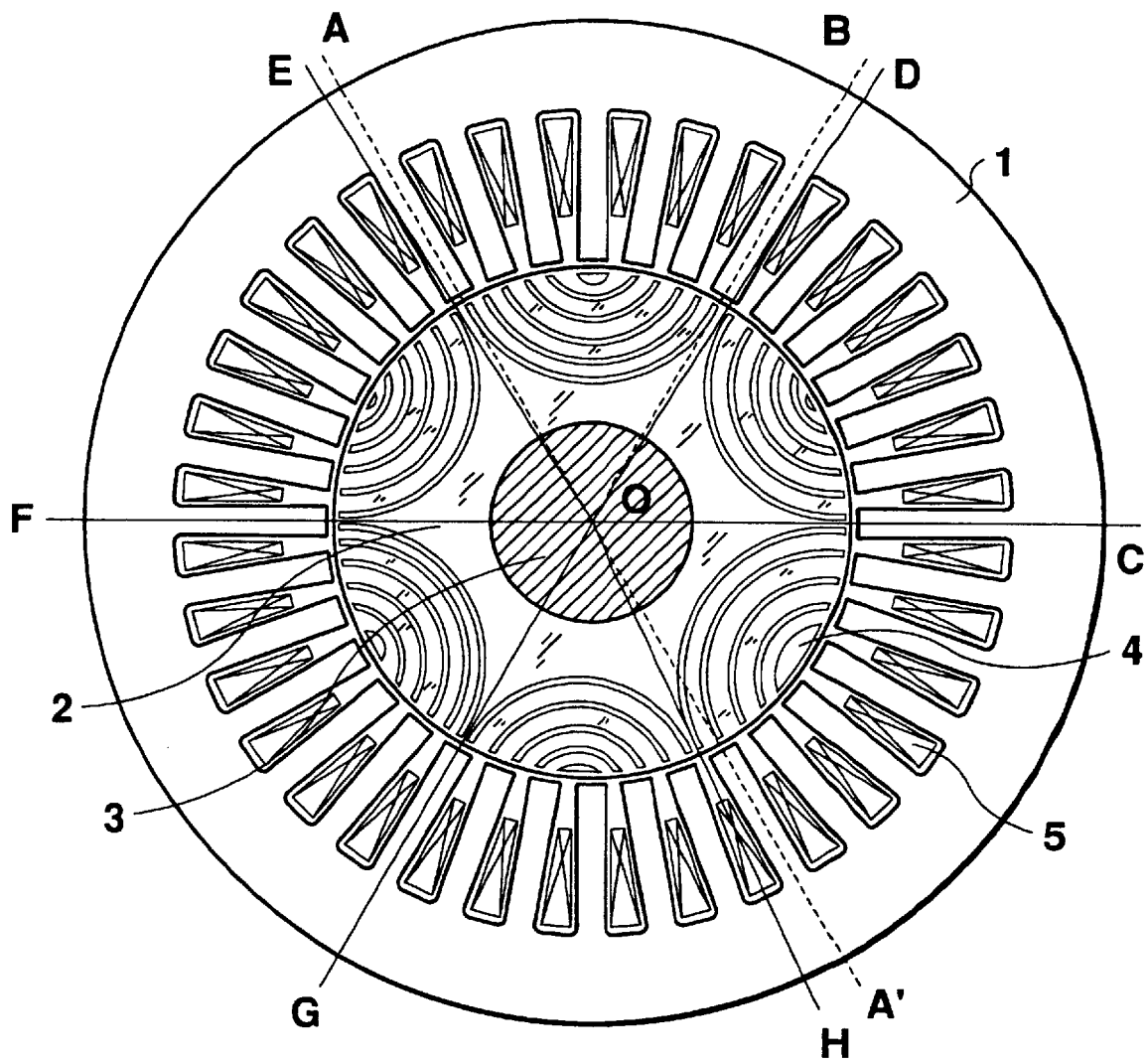
FIG. 4 is a diagram showing a fourth embodiment of a rotor and a stator of a synchronous motor related to the present invention.
Figure 5:
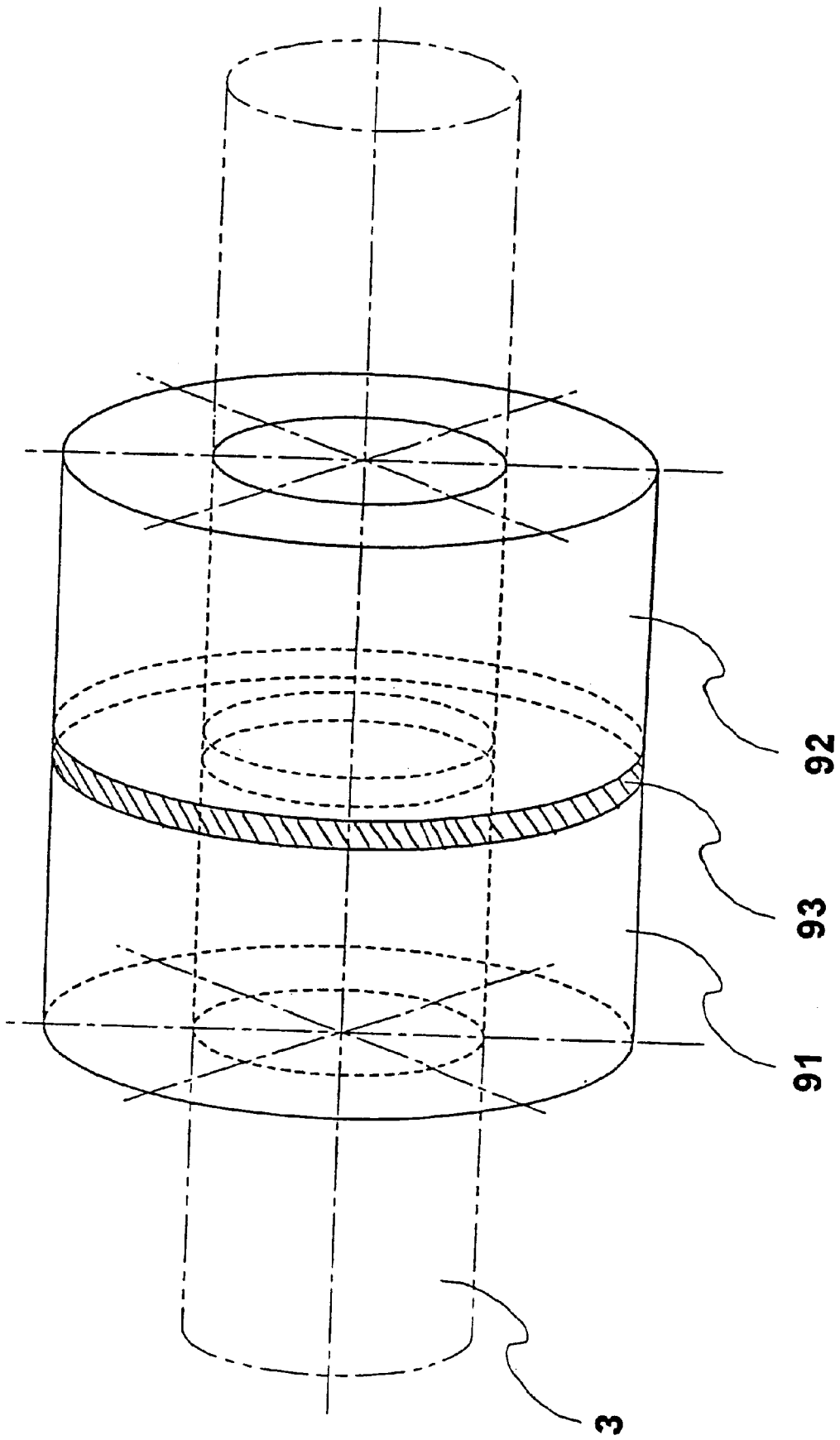
FIG. 5 is a side view showing a fifth embodiment of a rotor of a synchronous motor related to the present invention.

FIGS. 4 and 5 show fourth and fifth embodiments of the present invention combining embodiments of FIGS. 2 and 3.

In the fourth embodiment shown by FIG. 4, a rotor comprises magnetic poles shifted by ½($\theta_s$=5°) and ⅓($\theta_s$= 3.3°) of a slot angle of a stator. These magnetic poles are placed to complete a closed rotor circumference. The upper half circle is equivalent to the third embodiment shown by FIG. 3. A portion corresponding to ∠COG is equivalent to the second embodiment shown by FIG. 2, while a portion corresponding to ∠FOG is equivalent to a prior art rotor shown by FIG. 14.

In the fifth embodiment shown by FIG. 5, a rotor comprises a rotor piece 91 shifted by ½ of a slot angle of a stator (shift angle $\theta_s$=5°), a rotor piece 92 shifted by ⅓ of a slot angle of a stator (shift angle $\theta_s$=3.3°), and a magnetic isolating portion 93. The rotor pieces are placed along a rotational shaft, with the magnetic isolating portion 93 being placed between rotor pieces 91 and 92.

The magnetic isolating portion 93 is placed to prevent magnetic leakage along the rotational shaft and to use magnetism effectively. The leakage is caused at a boundary of rotor pieces by magnetic reluctance unbalance occurred at the rotor pieces 91 and 92.

By changing fixing angles of each rotor piece 91 or 92 relative to circumference of the rotational shaft 3, skew effect by both blocks can be obtained. Therefore, this effect has great influence on torque ripple reduction.

The embodiments shown by FIGS. 4 and 5 aim to average ripples by superposing two kinds of high harmonics in circumferential direction of a rotor rotating around the rotational shaft. Skew effect by rotor blocks in FIG. 5 has an advantage that any phase may be chosen to cancel ripples because a relative fixing angle can be chosen when rotor blocks 91 and 92 are fixed along the rotational shaft 3.

Configurations of the magnetic isolating portions 4 of a rotor will be explained referring to FIGS. 6–10. For convenience in explanation, a ¼ model describing one d-axis 6 to the other d-axis 6 is explained with a q-axis 7 centered between the d-axes.

The configurations of the magnetic isolating portions 4 shown by FIGS. 6–10 are not necessarily combined with the above-described embodiments shown by FIGS. 1–5. Each isolator has an effect of distributing inductance change sinusoidaly between a stator 1 and a rotor. Greater effects can be obtained by combining the isolators with the embodiments shown by FIGS. 1–5.

Figure 6:
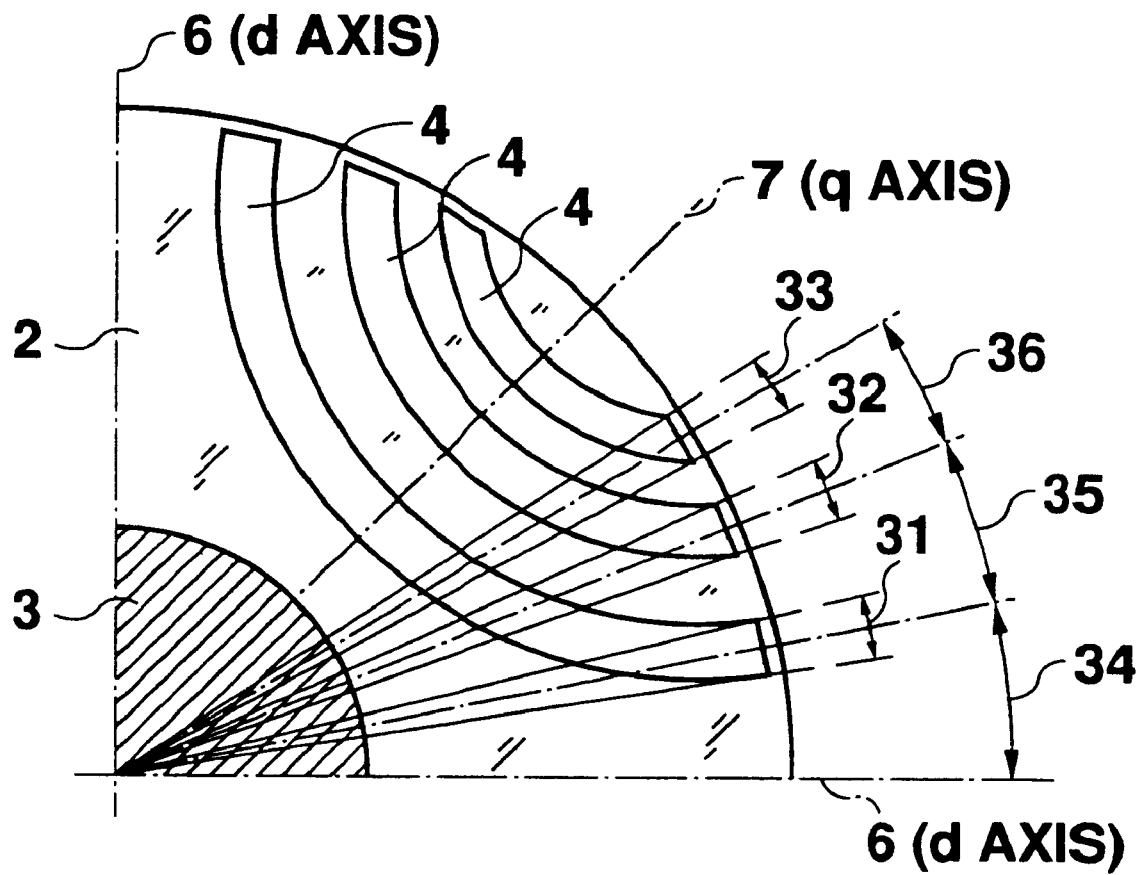
FIG. 6 is a detailed diagram of magnetic isolating portions showing a sixth embodiment of a rotor of a synchronous motor related to the present invention.

A sixth embodiment shown by FIG. 6 is an example of the magnetic isolating portions 4 having equal aperture angles 31, 32, and 33 at the periphery of a rotor, and gradually changing aperture pitch angles 34, 35, and 36.

The aperture pitch angle 34 is divided by a d-axis 6. Therefore, actual aperture pitch angle is 2× the aperture pitch angle 34. Hereafter, aperture pitch angles adjacent to the d-axis 6 have actual aperture pitch angles which are two times the angles shown in the figure.

In FIG. 6, the aperture pitch angles have the following relationship:

(2×the aperture pitch angle 34)>aperture pitch angle 35 >aperture pitch angle 36.

Figure 7:
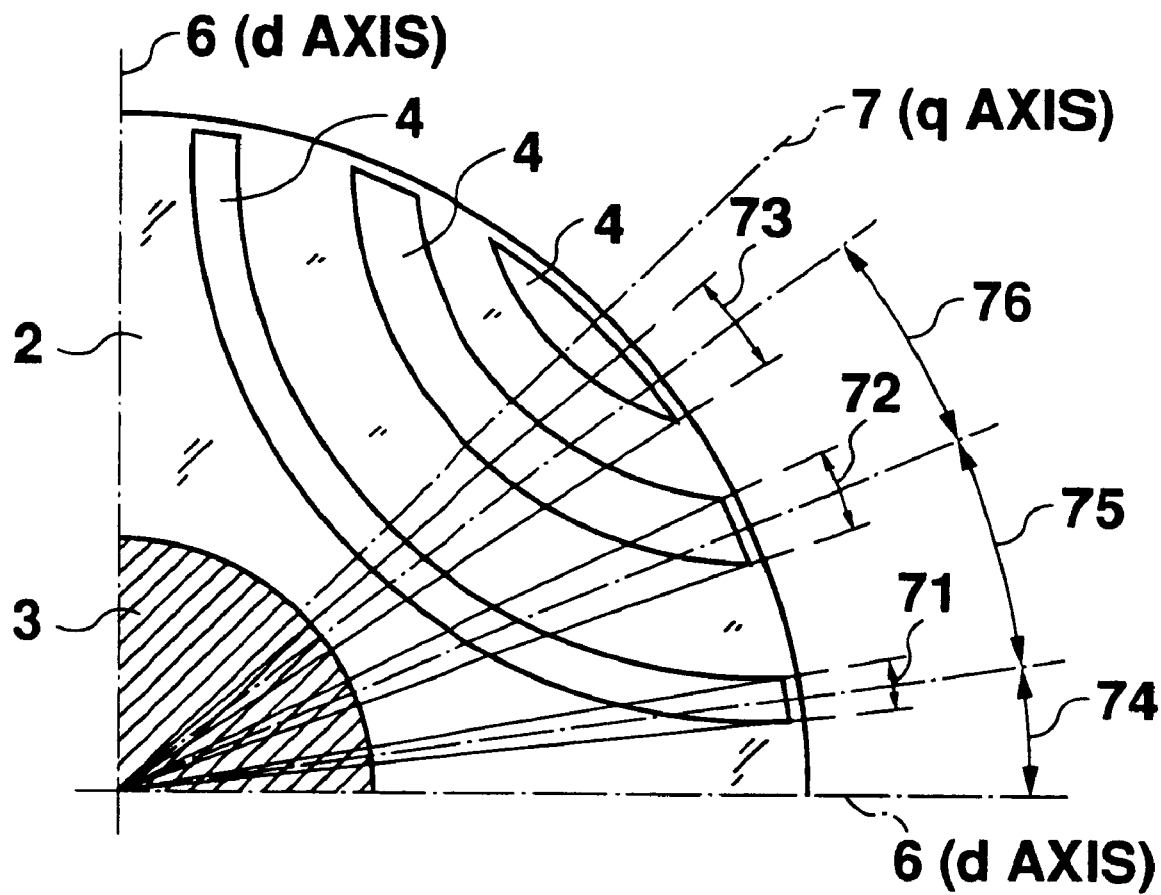
FIG. 7 is a detailed diagram of magnetic isolating portions showing a seventh embodiment of a rotor of a synchronous motor related to the present invention.

FIG. 7 shows a configuration of magnetic isolating portions 4 related to a seventh embodiment of the present invention. Aperture pitch angles have the following relationship:

(2×the aperture pitch angle 74)=aperture pitch angle 75=aperture pitch angles 76, and aperture angle 71<aperture angle 72 <aperture angle 73.

When corresponding aperture angles and aperture pitch angles are respectively equal without deviating from a scope of the present invention, a combination, not shown by the figures, of gradually changing, from the d-axis to the q-axis, aperture pitch angles and aperture angles also work.

Figure 8:
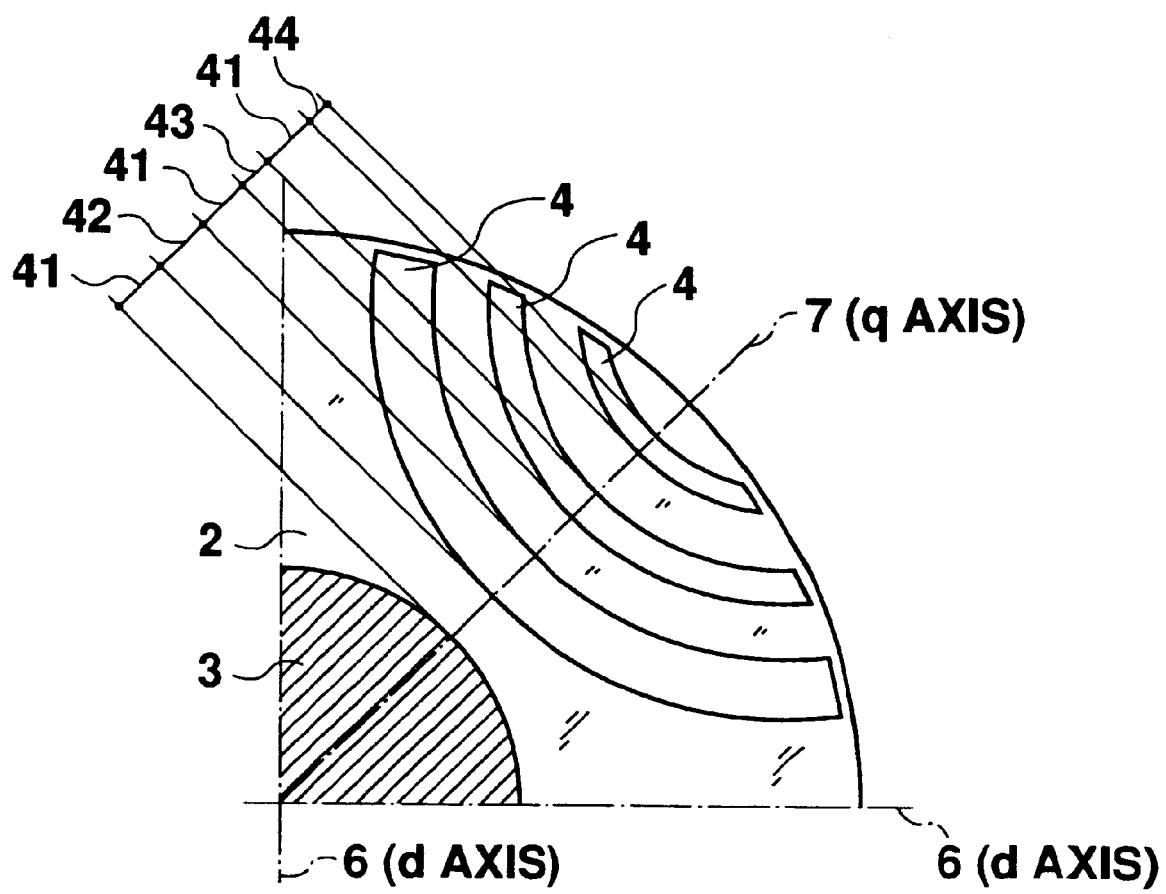
FIG. 8 is a detailed diagram of magnetic isolating portions showing an eighth embodiment of a rotor of a synchronous motor related to the present invention.
Figure 9:
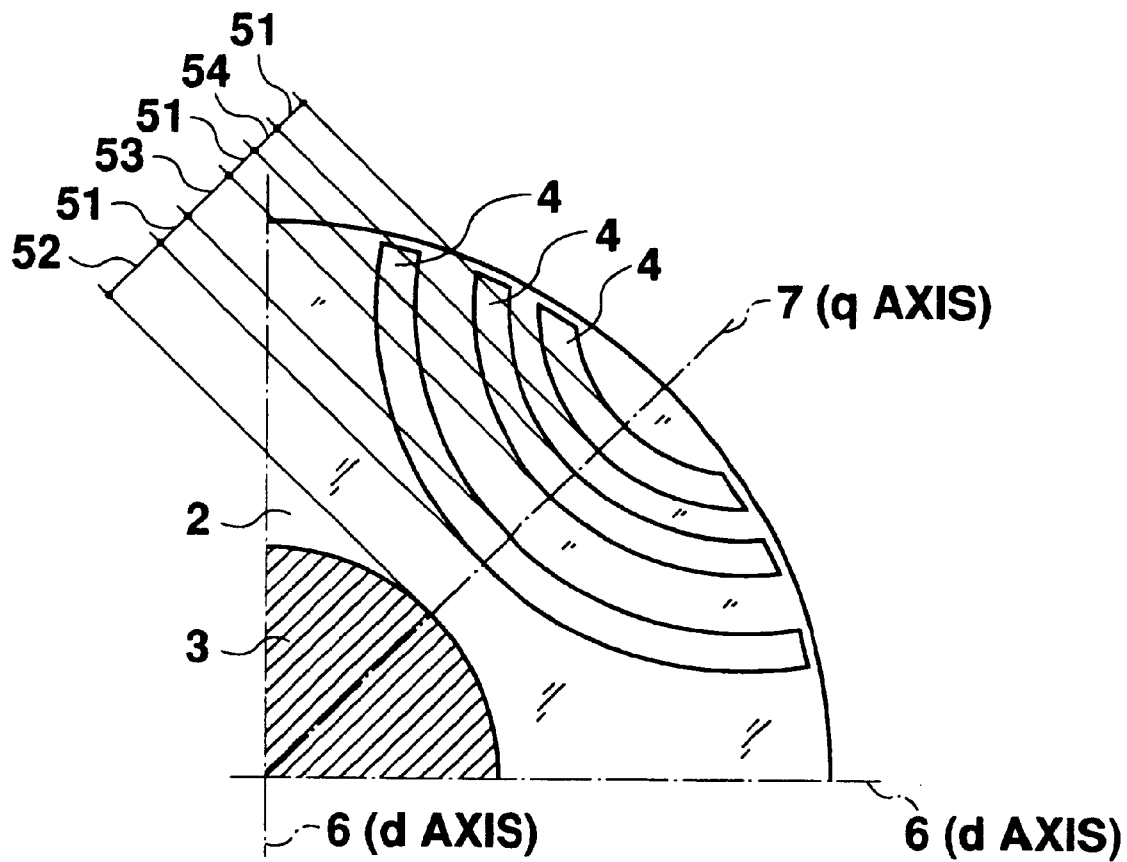
FIG. 9 is a detailed diagram of magnetic isolating portions showing a ninth embodiment of a rotor of a synchronous motor related to the present invention.
Figure 10:
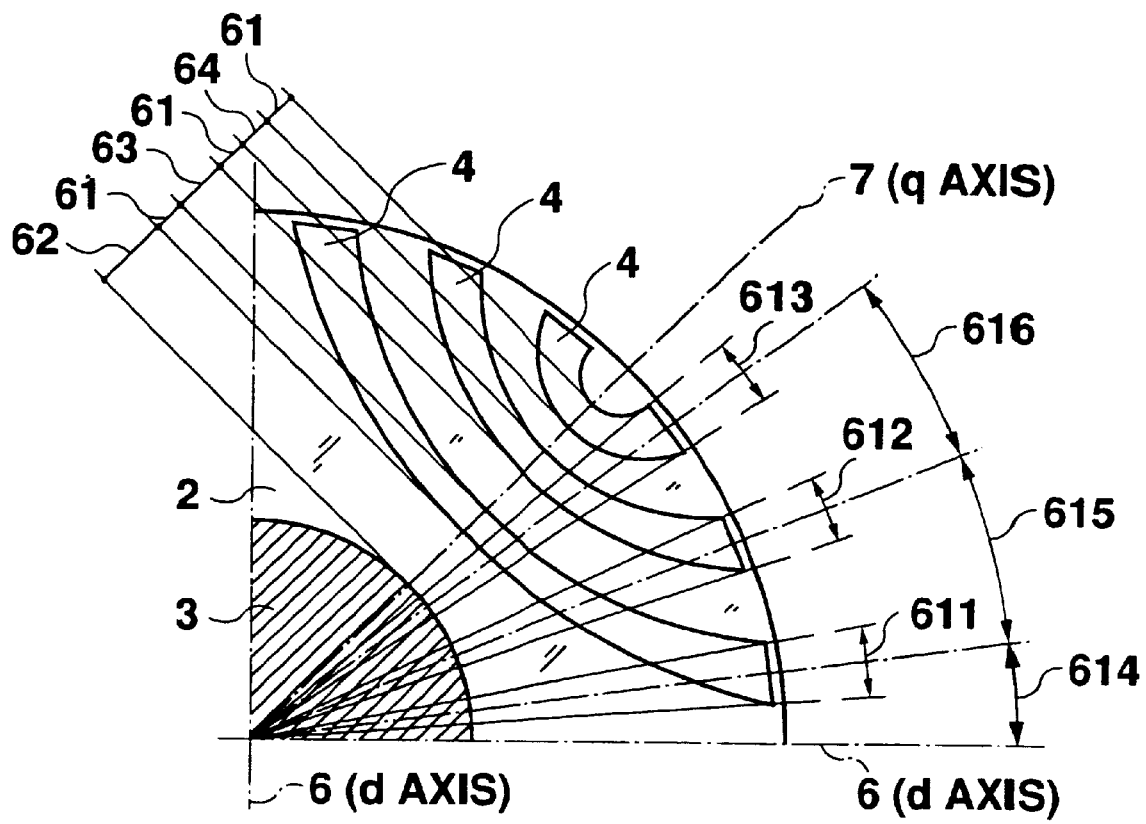
FIG. 10 is a detailed diagram of magnetic isolating portions showing a tenth embodiment of a rotor of a synchronous motor related to the present invention.

FIGS. 8–10 show examples to change magnetic reluctance within a rotor, without deviating from a scope of the present invention.

FIG. 8 shows another configuration of magnetic isolating portions 4 related to an eighth embodiment of the present invention. Gap width of the magnetic isolating portions 4 which cross the q-axis 7 gradually changes in radial direction. In FIG. 8, magnetic path width 41 is constant. Width 42, 43, and 44 of magnetic isolating portions has the following relationship:
magnetic isolating portion width 42>magnetic isolating portion width 43 >magnetic isolating portion width 44. The magnetic isolating portions 4 are placed concentrically.

In a ninth embodiment of the present invention shown by FIG. 9, width 51 of magnetic isolating portions are constant, while width 41 of magnetic paths is constant in the eighth embodiment. Width 52–54 of magnetic paths created by a soft magnetic material 2 has the following relationship:
width 52 of magnetic path>width 53 of magnetic path>width 54 of magnetic path.
Magnetic isolating portions 4 are placed concentrically, in the same way as shown in FIG. 5.

In a tenth embodiment of the present invention shown by FIG. 10, aperture angles 611, 612, and 613 are equal (aperture angle 611=aperture angle 612=aperture angle 613), and aperture pitch angles 614, 615, and 616 have the following relationship:
(2×aperture pitch angle 614)=aperture pitch angle 615= aperture pitch angle 616.
Width 61 of magnetic isolating portions 4 which crosses a q-axis 7 are constant. Width 62, 63, and 64 of magnetic paths has the following relationship:
width 62 of magnetic path>width 63 of magnetic path>width 64 of magnetic path.
Setting parameters like the above may lead to different width of the magnetic isolating portions 4 compared at the vicinity of the q-axis and at the vicinity of apertures in the rotor circumference.

Figure 11:
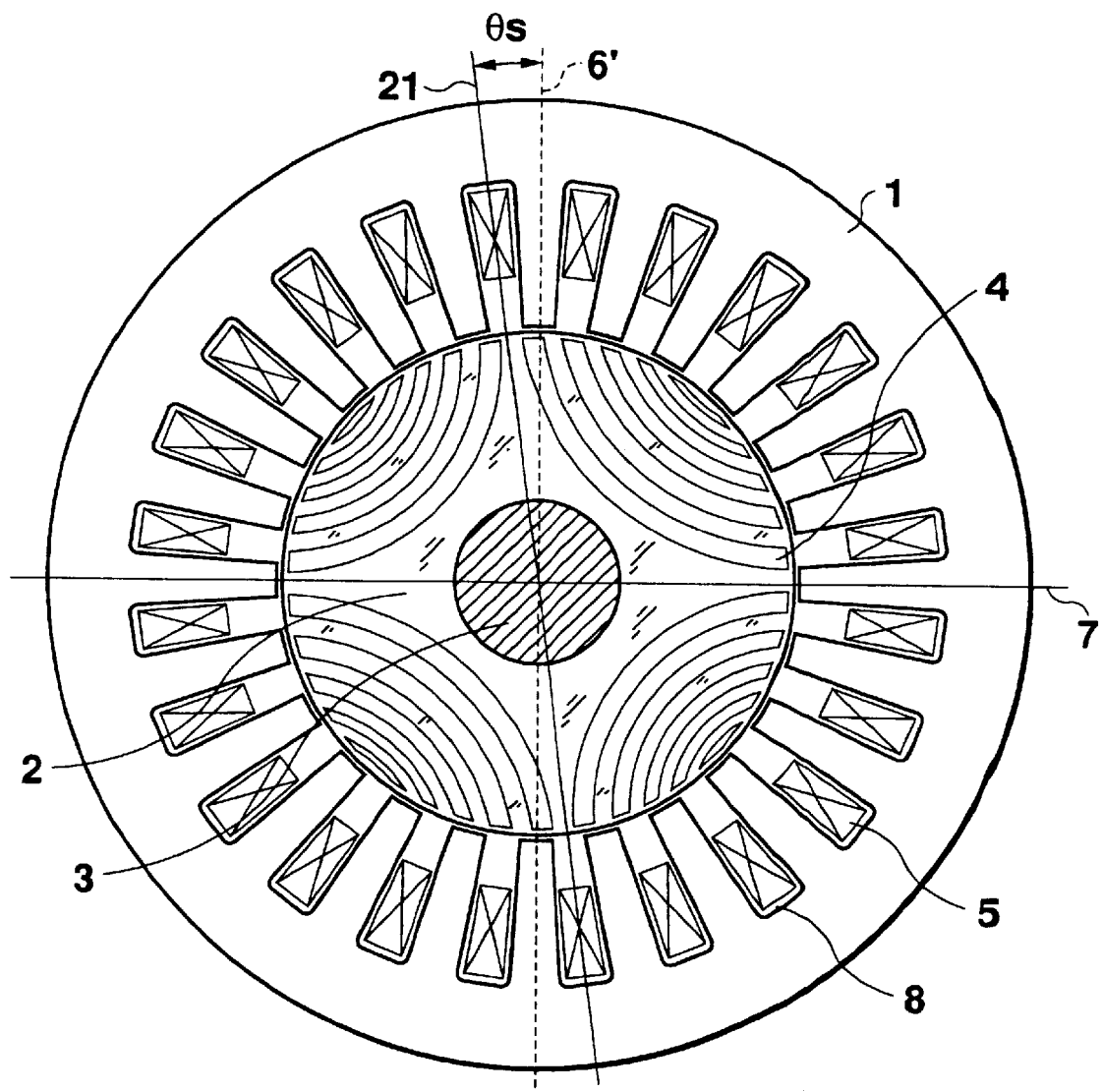
FIG. 11 is a diagram showing an eleventh embodiment of a rotor of a synchronous motor related to the present invention.

A eleventh embodiment of the present invention is shown by FIG. 11. In the eleventh embodiment, magnetic isolating portions (slits) gradually change in circumferential direction, and shift of rotor's central angle, as shown by FIG. 1, is also performed.

FIG. 11 shows an example of a rotor with gradually changing width of both slits and magnetic paths. Embodiments in which magnetic reluctance gradually changes are not limited to the embodiment 11. A path configuration shown in the embodiment 11 will be able to be incorporated with other path configurations shown in the embodiments 6–10.

Figure 12A:
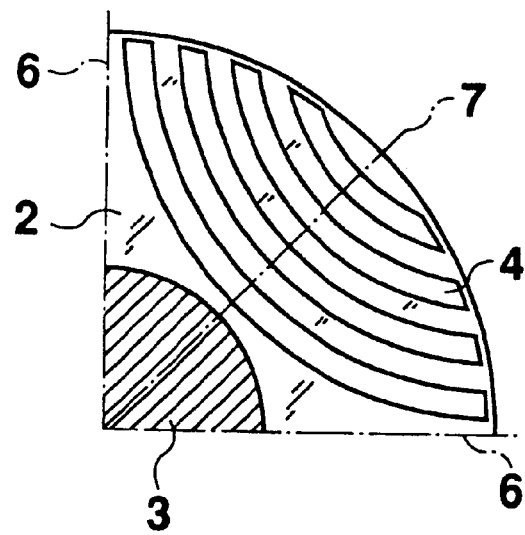
FIGS. 12(a), (b) and (c) are diagrams showing a twelfth embodiment of a rotor of a synchronous motor related to the present invention.
Figure 12B:
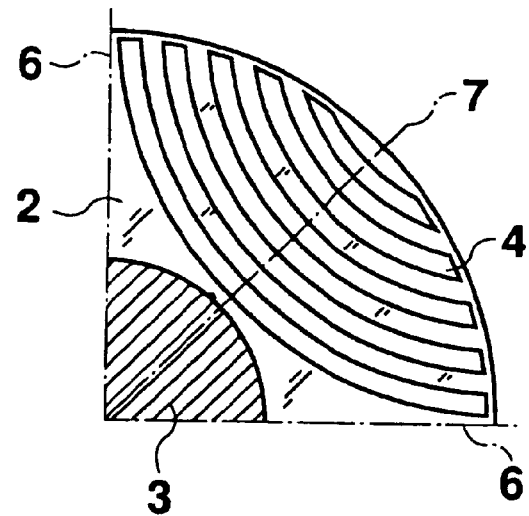
Figure 12C:
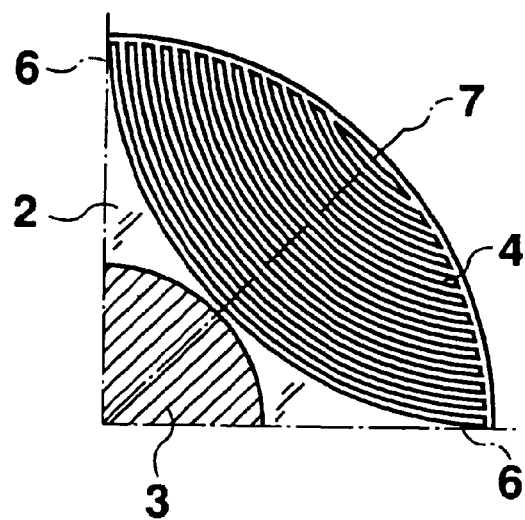

FIGS. 12(a)–(c) show another configuration of magnetic isolating portions (slots) of a rotor related to a twelfth embodiment of the present invention. The present invention is applicable to magnetic poles with a few slits as shown in FIG. 1 and FIG. 12(a), and also applicable to magnetic poles with a plurality of slits as shown in FIG. 12(c). Magnetic poles with a plurality of slits have fine magnetic paths created by magnetic isolating portions within a rotor. Therefore, dispersion of magnetic reluctance change in rotational direction is reduced, which leads to a greater effect on ripple reduction. In other words, greater torque ripples will occur when the number of slits is smaller and magnetic paths are rougher (due to a greater energy change rate). When the number of slits becomes larger, torque ripples will occur with smaller amplitude and higher harmonics.

Figure 13A:
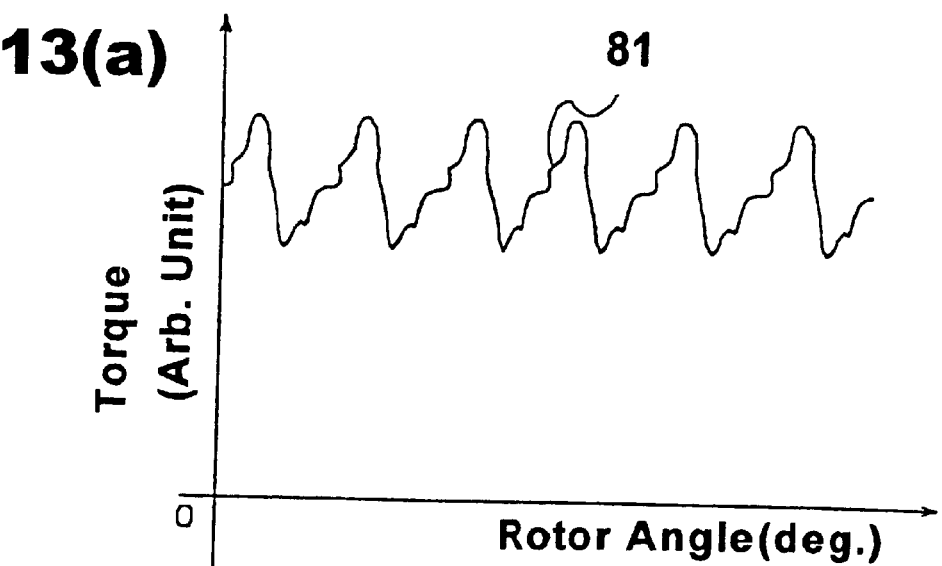
FIGS. 13(a) and (b) are graphs showing characteristics of a prior art reluctance motor and a reluctance motor of the present invention.

FIG. 13(a) and (b) show an example of improvement in torque ripple reduction.

FIGS. 13(a) and (b) show a change in torque ripples versus rotation angle of a rotor.

Figure 13B:
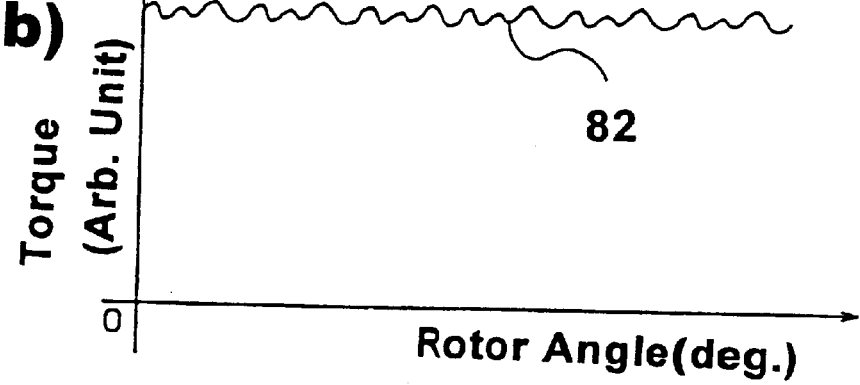
Figure 14:
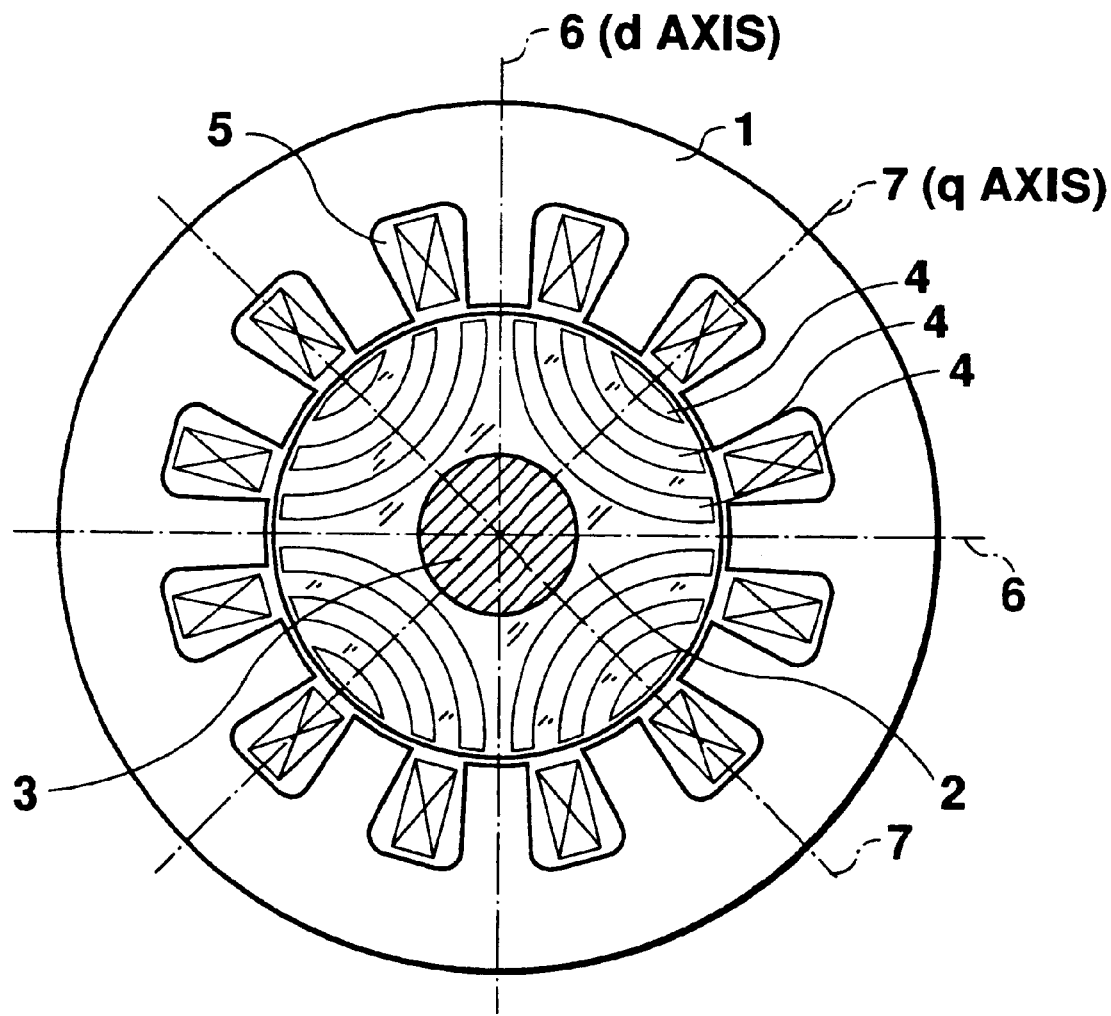
FIG. 14 is a diagram showing an example of a rotor and a stator of a prior art synchronous motor.

A characteristic curve 81 in FIG. 13 (a) shows torque ripples occurred when the prior art reluctance type synchronous motor shown in FIG. 14 is controlled. Ripples, especially slot ripples due to teeth of the stator 1 and ripples due to the rotor shape with dispersed placements of magnetic isolating portions 4 and a soft magnetic material 2, superpose periodically. These large amplitude ripples cause trouble in operation.

A characteristic curve 82 shown by FIG. 13 (b) shows an example of torque ripples occurring when rotors shown in FIGS. 1–12(c) and combinations of them are used. Although small amplitude torque ripples as a shole are present, ripples are reduced greatly.

As described above, according to the present invention, torque ripples cancel each other by the magnetic pole pairs of each rotor shown by FIGS. 1–12(c). As a result, torque ripples are reduced.

Since magnetic reluctance distribution at a rotor's circumference is even, magnetic fluxes are more easily confined within a rotor. Therefore, torque ripple reduction can be performed with more certainty as compared to torque ripple reduction using skewing.

Since no preparation or steps for skewing are necessary, the present invention leads to an advantage of lower costs.

The present invention is not limited to the embodiments shown by FIGS. 1–12(c). Other modifications as below may be performed without deviating from the scope of the present invention.

(1) The present invention may be applicable to a reluctance linear motor.

(2) In explanation of the preferred embodiments, the magnetic isolating portion 4 is described by one continuous slit. However, to strengthen a rotor, the magnetic isolating portion 4 may be configured by bridging soft magnetic materials at the q-axis 7.

(3) In the embodiments described above, tooth shape of the stator 1 is linear so that the stator 1 has apertures. However, slots with closed circumference to short-circuit magnetism also work.

(4) In the figures, rotor shape is cylindrical. However, a salient pole structure rotor (flux barrier type) with concaves at the q-axis also works.

(5) In the present invention, control of magnetic reluctance is performed by setting magnetic isolating portions (slits) within a rotor. However, control of magnetic reluctance may also be performed using a stator instead of a rotor.

For example, stator magnetic pole central angles may be shifted while rotor magnetic pole central angles are kept constant. In this way, width between teeth of the stator is constant, while slot pitch angles are not even. In other words, both magnetic paths within a rotor and teeth of a stator cause dispersion of magnetic reluctance changes between them in rotational direction. Therefore, to average magnetic reluctance, it is easy to switch structures between a stator and a rotor.

(6) A combination of a known skewing technique (on a rotor or a stator) and the present invention may also be used. Examples such as a combination of skewing and central angle shift of a rotor, or a combination of skewing and gradually changing aperture angle of a rotor's magnetic isolating portions (slits) in circumferential direction are also possible.

While there has been described what are at present considered to be preferred embodiments of the invention, it will be understood that various modifications can be made thereto, and it is intended that the appended claims cover all such modifications as fall within the true spirit and scope of the invention.

What is claimed is:

1. A reluctance type synchronous motor comprising:
   a stator constructed to include a plurality of slots placed at an even pitch angle, and each containing a stator winding to define stator magnetic poles when a predetermined phase alternating current is supplied thereto; and a rotor rotatably supported by a rotor shaft, said rotor formed of rotor steel sheets stamped from soft magnetic steel blanks using a press machine, the rotor steel sheets being stacked along an axial direction of the rotor and axially laminated to form rotor magnetic poles in which circumferential magnetic reluctance can be adjusted by slits provided in said rotor steel sheets and closed at an outer periphery of said rotor, wherein the slits isolate magnetic paths on the plates, magnetic flux passes along the magnetic paths and at least one central angle between the magnetic poles formed on the rotor is shifted by θs from other unshifted central angles between the magnetic poles formed on the rotor, θs being given by $$\theta s = \pm(360/Ns)/(P/m) \text{ (in degrees)},$$

where P is a number of magnetic poles of the rotor, Ns is a number of the slots on the stator, m is an arbitrary integer, and (360/Ns) is a central angle of the pitch of the stator slots.

2. The reluctance type synchronous motor as claimed in claim 1, wherein the angle by which the shifted central angles is shifted is equal to ±½ of a stator slot pitch angle.

3. The reluctance type synchronous motor as claimed in claim 1, wherein the angle by which the shifted central angle or angles is shifted is equal to ±⅓ of a stator slot pitch angle.

4. The reluctance type synchronous motor as claimed in claim 1, wherein at least one of the angles by which the shifted central angle or angles is shifted is equal to ½ or -½ of a stator slit pitch angle of the stator, and at least one of the other angles by which the shifted central angles or angles is shifted is equal to ⅓ or -⅓ of a stator slot pitch angle.

5. The reluctance type synchronous motor as claimed in claim 1, wherein the rotor comprises at least two rotor blocks placed next to each other along the shaft direction, and wherein one of these rotor blocks has an angle to shift central angles magnetic poles being ½ or -½ of a slot pitch angle of the stator and the other rotor block has an angle to shift central angles of magnetic poles being ⅓ or -⅓ of a slot pitch angle of the stator.

6. A reluctance type synchronous motor according to claim 1, wherein the slits provided in the rotor are bridged with soft magnetic materials that create a magnetic short-circuit and structural reinforcement.

7. A reluctance type synchronous motor according to claim 1, wherein the value of (360/Ns)/Sp is not an integer, where Sp is a pitch of the slits or the magnetic paths on the rotor surface, and Ns is a number of the slots on the stator.

8. A reluctance type synchronous motor comprising:

a stator constructed to include a plurality of slots placed at an even pitch angle and each containing a stator winding to define stator magnetic poles when a predetermined phase alternating current is supplied thereto; and a rotor rotatably supported by a rotor shaft, said rotor formed of rotor steel sheets stamped from soft magnetic steel blanks using a press machine, the rotor steel sheets being stacked along an axial direction of the rotor and axially laminated to form rotor magnetic poles in which circumferential magnetic reluctance can be adjusted by slits provided in said rotor steel sheets and closed at an outer periphery of said rotor;

wherein the slits isolate magnetic paths on the plates, magnetic flux passes along the magnetic paths and an aperture angle of each slit and/or an aperture angle of each magnetic path gradually changes in a circumferential direction from a d-axis to a q-axis.

9. A reluctance type synchronous motor comprising:

a stator constructed to include a plurality of slots placed at an even pitch angle, and each containing a stator winding to define stator magnetic poles when a predetermined phase alternating current is supplied thereto; and a rotor rotatably supported by a rotor shaft, said rotor formed of rotor steel sheets stamped from soft magnetic steel blanks using a press machine, the rotor steel sheets being stacked along an axial direction of the rotor and axially laminated to form rotor magnetic poles in which circumferential magnetic reluctance can be adjusted by slits provided in said rotor steel sheets and closed at an outer periphery of said rotor, wherein the slits isolate magnetic paths on the plates, magnetic flux passes along the magnetic paths and the width of a q-axis line intersecting each slit and/or magnetic path gradually changes in a radial direction from a center of the rotor shaft to the outer periphery of the rotor.

10. A reluctance type synchronous motor comprising:

a stator constructed to include a plurality of slots placed at an even pitch angle, and each containing a stator winding to define stator magnetic poles when a predetermined phase alternating current is supplied thereto; and a rotor rotatably supported by a rotor shaft, said rotor formed of rotor steel sheets stamped from soft magnetic steel blanks using a press machine, the rotor steel sheets being stacked along an axial direction of the rotor and axially laminated to form rotor magnetic poles in which circumferential magnetic reluctance can be adjusted by slits provided in said rotor steel sheets and closed at an outer periphery of said rotor, wherein the slits isolate magnetic paths on the plates, magnetic flux passes along the magnetic paths and at least one central angle between magnetic poles formed on the stator is shifted to a value different from the other central angles.

11. A reluctance type synchronous motor comprising:

a stator constructed to include a plurality of slots placed at an even pitch angle, and each containing a stator winding to define stator magnetic poles when a predetermined phase alternating current is supplied thereto; and a rotor rotatably supported by a rotor shaft, said rotor formed of rotor steel sheets stamped from soft magnetic steel blanks using a press machine, the rotor steel sheets being stacked along an axial direction of the rotor and axially laminated to form rotor magnetic poles in which circumferential magnetic reluctance can be adjusted by slits provided in said rotor steel sheets and closed at an outer periphery of said rotor, wherein the slits isolate magnetic paths on the plates, magnetic flux passes along the magnetic paths and a value of (360/Ns)/Sp is not an integer, where Sp is a pitch of the slits or the magnetic paths on the rotor surface and Ns is a number of the slots on the stator.

* * * * *